C. H. HATHAWAY.
AUTOMOBILE BUMPER.
APPLICATION FILED JAN. 3, 1921.

1,396,201. Patented Nov. 8, 1921.

Inventor
Charles H. Hathaway

UNITED STATES PATENT OFFICE.

CHARLES H. HATHAWAY, OF MILWAUKEE, WISCONSIN, ASSIGNOR TO BADGER MANUFACTURING CORPORATION, OF MILWAUKEE, WISCONSIN, A CORPORATION OF DELAWARE.

AUTOMOBILE-BUMPER.

1,396,201.                    Specification of Letters Patent.       Patented Nov. 8, 1921.

Application filed January 3, 1921. Serial No. 434,724.

*To all whom it may concern:*

Be it known that I, CHARLES H. HATHAWAY, a citizen of the United States, residing at Milwaukee, in the county of Milwaukee and State of Wisconsin, have invented new and useful Improvements in Automobile-Bumpers, of which the following is a specification.

This invention relates to an automobile bumper.

The automobile bumper to which the invention is particularly applicable is a spring bumper comprising in general a vertically rigid and a horizontally resilient front member having integral looped ends, the inturned ends of which may be connected to the sidebar of an automobile frame by means of two independent vertically and horizontally rigid attaching arms.

An object of the invention is to provide a spring bumper having a wide buffing surface.

Another object is to provide an improved spring bumper which is simple, efficient and easy to manufacture.

Another object is to provide a spring bumper having a broad effective impact receiving section integral with the looped ends thereof.

Other objects and advantages will hereinafter appear.

The views of the drawings are:

Figure 1:
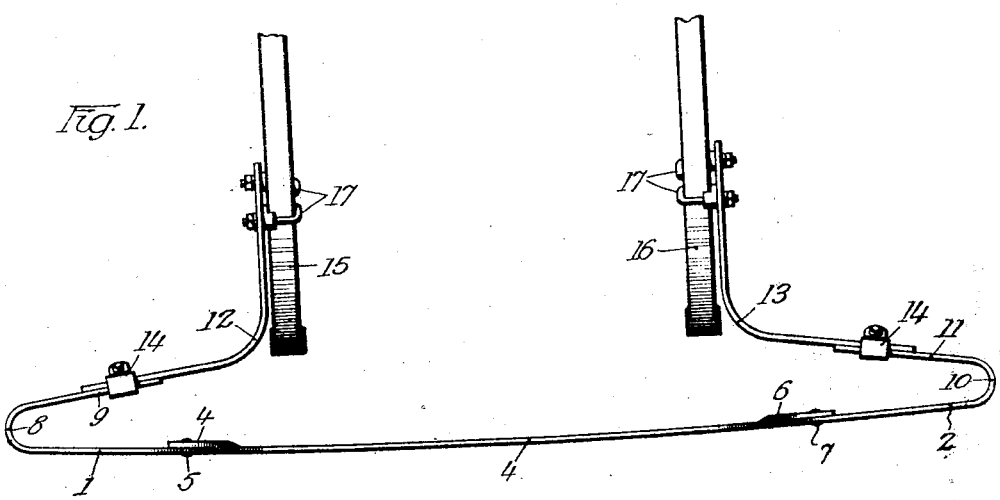
Figure 1 is a top plan of the bumper attached to an automobile frame.
Figure 2:
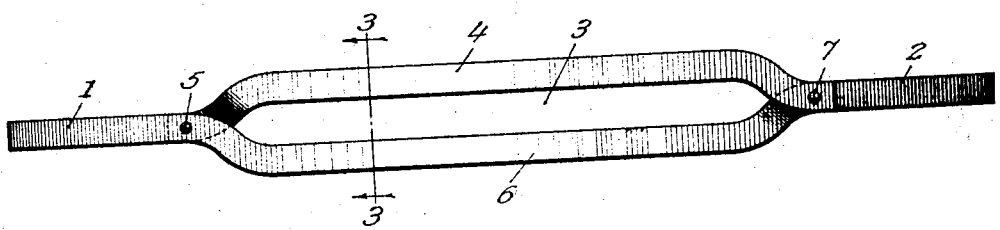
Fig. 2 is a front elevation of the bumper.
Figure 3:
Fig. 3 is a vertical section on line 3—3 of Fig. 2.

The bumper is formed of two similarly shaped vertically rigid and horizontally resilient bars 1 and 2, arranged to form a broad and relatively long closed loop 3, which provides a broad buffing surface.

The upper horizontal arm 4 of the loop 3 terminates at one end thereof and is rigidly fastened to the bar 1 by means of a rivet 5 or other suitable means. The other end of the horizontal arm 4 is integral with the bar 2.

Likewise, the lower horizontal arm 6 of the loop 3 terminates at one end of the loop and is rigidly fastened to the bar 2 by means of a rivet 7. The other end of the arm 6 is integral with the bar 1.

The bar 1 outside of the loop 3 has an integral looped end 8 and an inturned arm 9. Likewise, the bar 2 outside of the loop 3 has an integral looped end 10 and an inturned arm 11.

The horizontal arms 4 and 6 of the closed loop are arranged in substantially the same vertical plane, while the integral looped ends of the bars are in a horizontal plane.

The bumper may be attached to an automobile frame by means of rearwardly extending bumper attaching arms 12 and 13, the forward ends of which may be fastened rigidly to the inturned arms 9 and 11 by means of suitable clamps 14 or other suitable means. The rear ends of the attaching arms 12 and 13 may be fastened rigidly to the side bars 15 and 16 of an automobile frame by means of hook bolts 17 or other suitable attachers.

Thus, there is provided an automobile bumper having a forwardly disposed impact member composed of two parallel resilient bars rigidly fastened together at their ends and two U-shaped resilient arms integral with the respective parallel bars, and forming continuations thereof, the rearwardly disposed ends of the arms being arranged to be fastened to attaching arms by which the bumper may be attached to an automobile frame.

While but one embodiment has been illustrated, it is obvious that the invention contained herein is susceptible of other embodiments and adaptations.

The invention claimed is:

1. An automobile bumper comprising two flat vertically rigid and horizontally resilient bars, each having an integral looped end for connection to a bumper attaching arm, the other ends of the bars being arranged in vertical spaced relation, and forming a broad and relatively long closed loop, and means for rigidly fastening the bars together at opposite ends of the closed loop.

2. An automobile bumper comprising two flat vertically rigid and horizontally resilient bars, each having an integral looped end for connection to a rearwardly extending bumper attaching arm, the other ends of the bars being arranged in vertical spaced relation and forming a broad and relatively long closed loop, and clamping means at the ends of the loop extending through the bars and rigidly fastening the same together.

3. An automobile bumper comprising two similarly formed flat vertically rigid and horizontally resilient bars having their forward ends arranged in spaced relation in substantially the same vertical plane and forming a broad and relatively long closed-loop, and means for rigidly fastening the bars together at opposite ends of the closed loop, the rearward ends of the bars being arranged to be fastened to attaching arms for attachment to an automobile frame.

4. An automobile bumper comprising two similarly formed flat vertically rigid and horizontally resilient bars having their forward ends arranged in spaced relation in substantially the same vertical plane and forming a broad and relatively long closed loop, an integral loop at the other end of each bar and having an inturned arm for connection to a bumper attaching arm, and rivets at opposite ends of the loop extending through the bars and rigidly fastening the same together.

5. An automobile bumper comprising two similarly formed flat vertically rigid and horizontally resilient bars having their inner and forward ends arranged in spaced relation in substantially the same vertical plane and forming a broad and relatively long closed loop at opposite ends of which terminate the inner and forward ends of the respective bars, means for rigidly fastening the bars together at opposite ends of the loop, and an integral loop at each end of the closed loop having a rearward inturned arm to be fastened to a bumper attaching arm.

6. An automobile bumper comprising two similarly formed flat vertically rigid and horizontally resilient bars arranged in spaced relation in substantially the same vertical plane and forming a broad and relatively long closed loop, each bar extending from an end of the loop along one side thereof and beyond the other end thereof, and terminating in an integrally formed loop having an inturned arm for connection to a bumper attaching arm, and means for rigidly fastening the bars together at opposite ends of the loop.

7. An automobile bumper having in combination two similarly formed flat bars, each having at one end thereof an integral loop with an inturned arm and having its other end arranged to form with other bar a broad and relatively long closed loop in the plane normal to that of the integral loops, and means comprising rivets extending through the bars at opposite ends of the closed loop and rigidly fastening the bars together.

8. An automobile bumper having in combination two similarly formed flat bars, each having at one end thereof an integral loop, the other ends of the two bars being arranged to form a broad and relatively long closed loop and terminating at opposite ends thereof, and means comprising rivets for rigidly fastening the bars together at opposite ends of the closed loop.

9. An automobile bumper having in combination a vertically rigid and horizontally resilient bar, the central buffing section of which comprises two vertically spaced horizontal arms forming a broad and relatively long closed loop, and rearwardly extending attaching arms for supporting the bar on an automobile frame.

10. An automobile bumper having in combination a vertically rigid and horizontally resilient bar, the central buffing section of which comprises two vertically spaced horizontal arms forming a broad and relatively long closed loop, the sections of the bar extending beyond the closed loop having integral looped ends, and rearwardly extending attaching arms connected to integrally looped ends for supporting the bar on an automobile frame.

11. An automobile bumper having a forwardly disposed impact member formed of two parallel resilient bars connected together at their ends, and two U-shaped resilient arms integral with the respective parallel bars, the rearwardly disposed ends of the arms being arranged to be connected to bumper attaching arms.

12. An automobile bumper comprising two parallel resilient bars rigidly fastened together at their ends and forming an impact receiving section, and a U-shaped resilient bar integral with each parallel bar, the free end of each U-shaped bar being arranged for connection to a bumper attaching arm.

13. An automobile bumper having in combination two parallel vertically rigid and horizontally resilient bars forming a broad impact receiving section, means for rigidly fastening the bars together at their ends, and a U-shaped vertically rigid and horizontally resilient bar integral with each parallel bar and having its free end arranged for connection to a bumper attaching arm.

In witness whereof, I have hereunto subscribed my name.

CHARLES H. HATHAWAY.